J. WILKINSON.
DRAFT EQUALIZING ATTACHMENT.
No. 39,517. Patented Aug. 11, 1863.
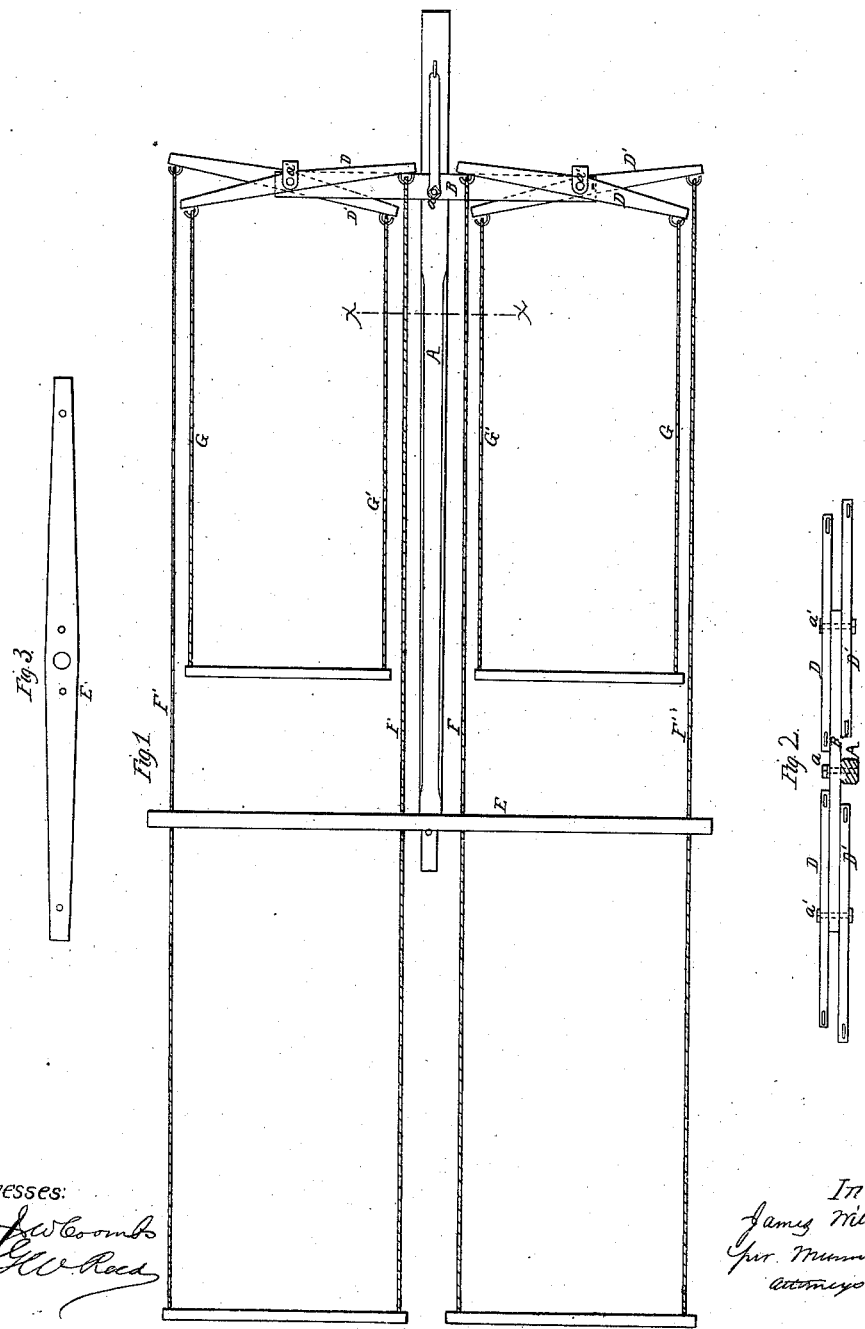

UNITED STATES PATENT OFFICE.

JAMES WILKINSON, OF PROPHETSTOWN, ILLINOIS.

IMPROVEMENT IN DRAFT-EQUALIZING ATTACHMENTS.

Specification forming part of Letters Patent No. 39,517, dated August 11, 1863.

*To all whom it may concern:*

Be it known that I, JAMES WILKINSON, of Prophetstown, in the county of Whiteside and State of Illinois, have invented a new and Improved Draft-Equalizing Attachment for a Reaper and other Wheel-Vehicles; and I do hereby declare that the following is a full, clear, and exact description of the same, reference being had to the accompanying drawings, making a part of this specification, in which—

Figure 1 is a plan or top view of my invention; Fig. 2, a transverse section of the same; Fig. 3, a detached view of the neck-yoke.

Similar letters of reference indicate corresponding parts in the several figures.

The invention consists in a novel arrangement of whiffletrees, draft-pole, double-tree, neck-yoke, and traces, as hereinafter fully shown and described, whereby the draft of the animals is rendered equal or the horses made to pull equally in drawing the reaper or other vehicle along.

The invention is more especially designed for reapers, but may be advantageously applied to other vehicles.

To enable those skilled in the art to fully understand and construct my invention, I will proceed to describe it.

A represents the draft-pole of a reaper, and B a double-tree, attached thereto, as usual, by a central bolt, *a*. To each end of the double-tree C there are attached by bolts *a'* two wiffletrees, D D'—one at the top and the other to the under side of the double-tree, as shown in Fig. 2. On the front end of the draft-pole A there is fitted a neck-yoke, E, to which the breast-straps of the wheel-horses are attached.

F F' represent the traces of the leaders or front horses, one of the traces, F, of each front horse being attached to the upper whiffletrees, D, and the other traces, F, of the same horses being attached to the lower whiffletrees, D'.

G G' represent the traces of the wheel-horses, one, G, of each horse being attached to the upper whiffletrees, D, and the other, G', to the lower whiffletrees, D', as shown clearly in Fig. 1. By this arrangement it will be seen that the traces of the two "near," as well as those of the two "off," horses are connected through the medium of the two pairs of whiffletrees D D', and the draft of said horses will consequently be equalized. The traces of the leaders or front horses pass through the neck-yoke E. The double-tree B operates in the usual way, and serves to equalize the draft between the near and off horses. The invention is a decided improvement for four-horse teams for reapers, as hitherto the leaders or front horses have, so far as an equal draft is concerned, remained isolated from the wheel-horses.

Having thus described my invention, what I claim as new, and desire to secure by Letters Patent, is—

The combination of the double-tree B, two pairs of whiffletrees, D D', traces F F' G G', and neck-yoke E, all arranged to operate as and for the purpose herein set forth.

JAMES WILKINSON.

Witnesses:
ANDREW WILKINSON,
A. H. WRIGHT.